United States Patent
Bosshart

(10) Patent No.: US 9,880,768 B2
(45) Date of Patent: Jan. 30, 2018

(54) DYNAMIC MEMORY REALLOCATION FOR MATCH-ACTION PACKET PROCESSING

(71) Applicant: Barefoot Networks, Inc., Palo Alto, CA (US)

(72) Inventor: Patrick Bosshart, Plano, TX (US)

(73) Assignee: BAREFOOT NETWORKS, INC., Palo Alto, CA (US)

( * ) Notice: Subject to any disclaimer, the term of this patent is extended or adjusted under 35 U.S.C. 154(b) by 170 days.

(21) Appl. No.: 15/007,209

(22) Filed: Jan. 27, 2016

(65) Prior Publication Data

US 2016/0216913 A1   Jul. 28, 2016

Related U.S. Application Data

(60) Provisional application No. 62/108,409, filed on Jan. 27, 2015.

(51) Int. Cl.
*G06F 12/00* (2006.01)
*G06F 3/06* (2006.01)
*H04L 12/741* (2013.01)

(52) U.S. Cl.
CPC ............ *G06F 3/0631* (2013.01); *H04L 45/74* (2013.01)

(58) Field of Classification Search
None
See application file for complete search history.

(56) References Cited

U.S. PATENT DOCUMENTS

| 7,110,404 | B1 * | 9/2006 | Temoshenko ....... H04L 12/2801 370/389 |
| 9,712,439 | B2 | 7/2017 | Bosshart et al. |
| 2002/0019904 | A1 * | 2/2002 | Katz ................. H04L 12/40065 710/316 |
| 2004/0032869 | A1 | 2/2004 | Ambe et al. |
| 2004/0160958 | A1 * | 8/2004 | Oh ...................... H04L 12/5601 370/395.1 |
| 2007/0110090 | A1 | 5/2007 | Musoll et al. |
| 2014/0241362 | A1 | 8/2014 | Bosshart et al. |
| 2014/0286336 | A1 | 9/2014 | Narayanan et al. |
| 2015/0378633 | A1 | 12/2015 | Sahita et al. |

* cited by examiner

*Primary Examiner* — John A Lane
(74) *Attorney, Agent, or Firm* — Adeli LLP

(57) ABSTRACT

A pool of unit memories is provided in order to flexibly allocate memory capacity to implement various tables and/or logical memories such as those for implementing an OpenFlow switch. The pool is structured with routing resources for allowing flexible allocation and reallocation of memory capacity to the various tables. The unit memories and logical units in the pool are interconnected by a set of horizontal routing resources and a set of vertical routing resources.

12 Claims, 14 Drawing Sheets

DYNAMIC MEMORY REALLOCATION FOR MATCH-ACTION PACKET PROCESSING

CLAIM OF BENEFIT TO PRIOR APPLICATIONS

The present application claims the benefit of U.S. Provisional Patent Application 62/108,409, filed Jan. 27, 2015. U.S. Provisional Patent Applications 62/108,409 is incorporated herein by reference.

BACKGROUND

OpenFlow is an evolving networking standard that uses match-action paradigm for network packet switching. OpenFlow in its original as well as current form is defined by a specification that originates with the concept of adding some level of architecture and protocol to existing and new network hardware so that network innovation may be explored with experimental packets, while such hardware continues also to serve "production" packets, that is, ongoing regular network communications to serve the regular network users. An additional OpenFlow endeavor is to overlay its implementation onto existing and newly developed hardware to allow the hardware manufacturers to continue to have their own proprietary structures and methodologies, while also providing the OpenFlow implementation so that features can be developed, and potentially added, to such proprietary hardware. Given the preceding, OpenFlow presents a potentially promising and evolving architecture and protocol that may facilitate numerous developments in networking.

SUMMARY

Some embodiments provide a pool of unit memories in order to flexibly allocate memory capacity to implement various tables and/or logical memories for performing match-action network packet switching (such as those performed by an OpenFlow switch, which uses match tables, action tables, statistics memories, meters memories, stateful memories, and ternary indirection memories). The pool is structured with routing resources for allowing flexible allocation of memory capacity to the various tables. The pool unit memories and logical units (LUs) that are interconnected by a set of horizontal routing resources and a set of vertical routing resources. Each row of unit memories is directly coupled to the horizontal routing resource of that row. The horizontal routing resources are interconnected by the vertical routing resources. The LUs can access the unit memories in the pool through the vertical and horizontal routing resources. In some embodiments, a flow table or a logical memory is implemented by an LU and a group of unit memories in the pool that are assigned to the LU. In some of these embodiments, the LU of a flow table uses the routing resources to read and/or write the unit memories in its group. In some embodiments, the allocation of unit memories is implemented by configuration of routing resources for allowing each LU unobstructed access to its unit memories.

In some embodiments, the horizontal routing resources of each row comprises three buses: a home row bus (Home), a horizontal overflow bus (H-overflow), and a horizontal swap bus (H-swap). The vertical routing resources comprise three buses: a vertical overflow bus (V-overflow), a down-swap bus (D-swap), and an up-swap bus (U-swap). Each of these buses comprises a read path for transporting read data from the unit memories to the LUs and a corresponding write path for transporting write data from the LUs to the unit memories. The home row bus of each row (i.e., the horizontal routing resource of each row) directly connects the LU of that row with unit memories of that row. The H-overflow bus of each row is connected to the V-overflow bus. The H-swap bus of each row is connected to U-swap and D-swap buses. A LU of a particular row can (i) use the Home bus for accessing unit memory at the particular row, (ii) use the V-overflow and H-overflow buses to access unit memories at rows above the particular row, (iii) use the H-swap and D-swap buses to access unit memories at rows above the particular row, and (iv) use H-swap and U-swap to access unit memories at rows below the particular row.

Some embodiments provide constraints upon memory placement algorithms to allow as much flexibility in allocation as possible while leaving at least some of the routing resources available for future re-allocations. In some embodiments, the memory allocation configuration is based on a set of constraints that minimizes usage of the vertical and horizontal routing resources: (1) each row of unit memories shall be assigned to no more than two different LUs (or tables); (2) each LU shall only be allocated unit memories at its home row or above. In some embodiments, a memory allocation configuration specified under the set of constraints leaves H-swap, U-swap and D-swap buses available for future routing.

In some embodiments, reallocation of memory capacity is performed while the pool of memory is actively being used as tables or logical memories for packet forwarding operations. Examples of such dynamic reallocations include growing a table or logic memory by allocating additional unit memories to the table, shrinking a table or logic memory by de-allocating unit memories from the table, and reallocating a unit memory from a first table to a second table. Some of these dynamic reallocation operations require moving memory content from one unit memory in one row to another unit memory in another row. In some of these embodiments, moving logical memories involves reassigning unit memories, copying content of unit memories, and reconfiguring the vertical and horizontal routing resources of one unit memory at a time as described above. In some embodiments, such movements are specified under a set of relaxed constraints that allows the use of additional routing resources (e.g., H-swap, U-swap and D-swap).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 1:
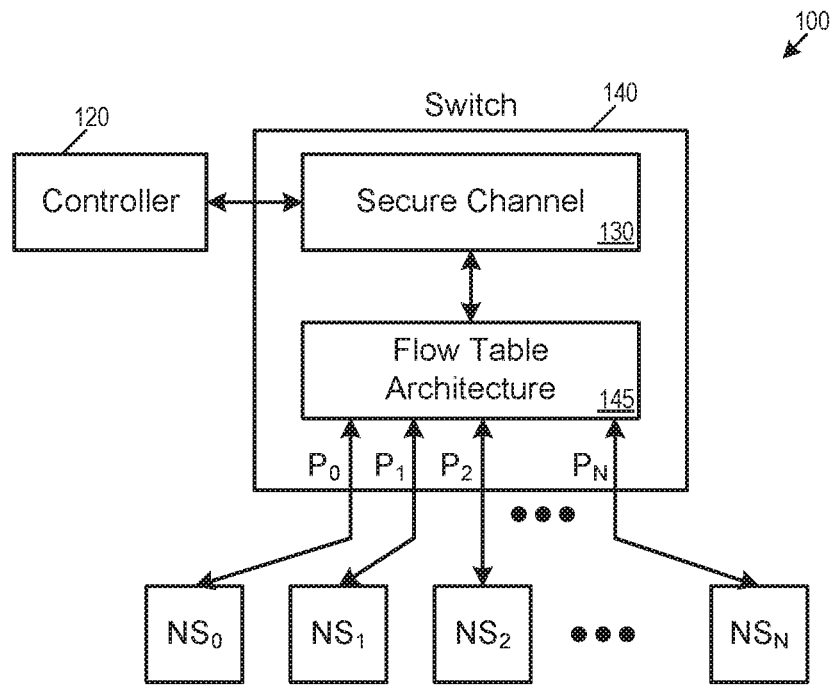
FIG. 1 illustrates a block diagram of an OpenFlow system.

The present invention identifies numerous potential improvements for a match-action network packet switching architecture. FIG. 1 illustrates a block diagram of a match-action packet processing system 100, that in some embodiments represents OpenFlow, both as originated and in its current form, although aspects therein are also improved as will be appreciated by one skilled in the art through the remainder of this document. System 100 includes a controller 120 and a switch 140, with a messaging protocol between the two, as shown by a secure channel 130. In some embodiments, the switch 140 can be a typical Ethernet packet processing switch and the controller 120 can be a personal computer, server, or workstation. The switch 140 includes a number of ports, shown as N+1 ports $P_0$ through $P_N$, where N is an integer greater than 1. Each port may be coupled to a respective network station NS, or another computing or communications device.

In some embodiments, network packets are routed to, processed by, and routed from the switch 140. In some embodiments, in accordance with OpenFlow, the switch 140 forwards some or all packets in packet traffic according to one or more tables, sometimes referred to as flow tables, that are included in a flow table architecture 145. As further appreciated herein, flow table architecture 145 includes memory or memories that serves as flow tables, as well as supporting and related circuitry. Though not illustrated, the switch 140 may also serve various packet functions such as routing and servicing ordinary or production packet traffic according to the switch manufacturer.

Figure 2:
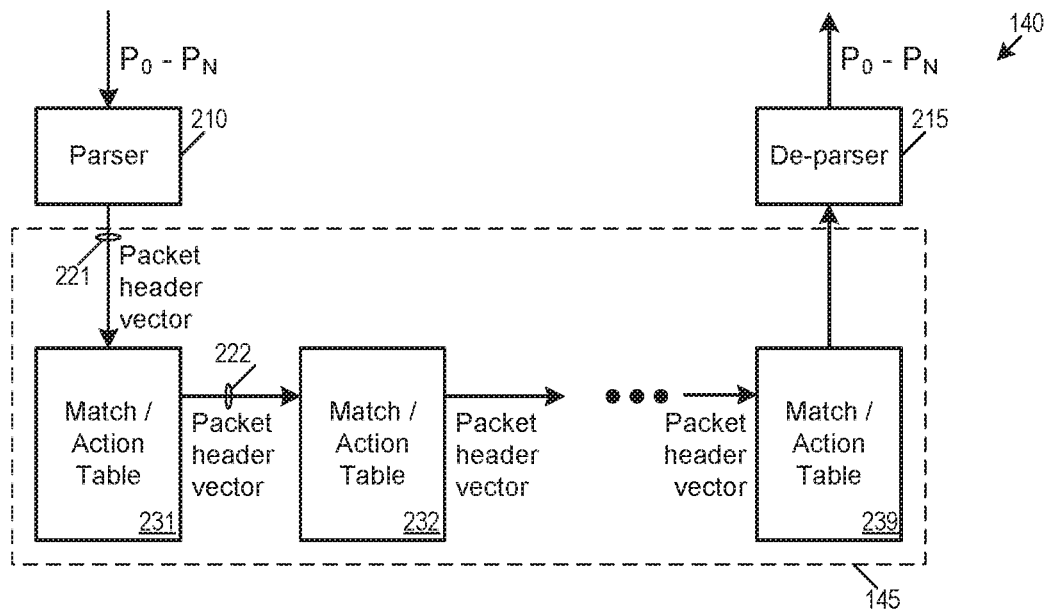
FIG. 2 illustrates a block diagram of a switch in an OpenFlow system.

FIG. 2 illustrates a block diagram of the switch 140 of FIG. 1 in some embodiments. Each of ports $P_0$ through $P_N$ is connected to a parser 210, which in general may select from any of various fields within the packet and align the information from the selected fields to create a packet header vector 221. The packet header vector 221 is submitted to a successive sequence of match/action tables 231-239, which are implemented in the switch 140 by the flow table architecture 145. The first match/action table 231 receives the packet header vector 221 and determines if the vector matches any content row within the table. If so, an action is taken. Thus, after one action is taken, a packet header vector 222 is submitted sequentially to another corresponding table to determine, again, if there is a match, and if so, the corresponding action is taken. Note that this packet header vector 222, submitted to a match/action table after the first match/action table 231, is created from the output of the first match/action table 231. The packet header vector submitted to a subsequent match/action table (i.e., match/action tables 232-239) can be an identical copy of the original packet header vector 221 inputting to the first match/action table 231, or a modified version of the original packet header (e.g., with portions or words of the packet header vector modified by a previous action.)

Different embodiments implement match/action table stages of the switch 140 differently. In some embodiments, selected modifications are postponed until after all match stages are executed. In some embodiments, a flow entry match specifies the address of the next table to be executed as a forward-only branch. Eventually, after all tables are consulted in this manner, the fields are presented to a de-parser 215, which realigns the fields into a packet, which is then output to the appropriate one of ports $P_0$ through $P_N$.

FIG. 2 is not intended to be exhaustive in its illustration of switch 140, as other aspects are known by one skilled in the art to be included. For example, a switch in some embodiments includes multiplexers, de-multiplexers, and buffers/queues, so as to receive and distribute packets, and also to accumulate packets and timely distribute them when packets are to be output to a same port that is already scheduled for outputting a number of already-waiting packets.

In some embodiments, a flow table in the match/action paradigm as illustrated in FIGS. 1-2 has rows. The OpenFlow vocabulary sometimes refers to each row as a separate "flow". In other words, a row defines both the criteria with which a packet header vector may match and something to occur for a packet that matches that row's criteria. Specifically for the example of FIGS. 1 and 2, the match-action switch 140 processes each packet by comparing information in the packet against each flow table row to determine if such information matches information in the row. If a match is found, then the row table also specifies an "action" to be taken with respect to the matching packet. The separate controller 120 of FIG. 1 operates, via the OpenFlow protocol and secure channel 130, to communicate commands to the switch 140 so as to modify the flow table(s). Additionally, if a packet is received by the switch 140 and has no match to a flow table row, then the switch 140 may drop the packet or route the packet (possibly encapsulating it in the process) to the controller 120. After receiving the packet, the controller 120 may communicate back to the switch 140 so as to modify the flow table to have a row that will then match to the packet. Alternatively, the controller 120 may merely drop the packet from traffic.

In some embodiments, the OpenFlow switch flow tables contain flow entries, each having ternary values for a selected set of packet header fields (i.e., for a packet header vector). For each packet header vector to be analyzed by the switch 140 under OpenFlow, table flow entries in a given table are searched in order (e.g., top address down), with the first matching entry returned. OpenFlow defines a set of recognized packet header fields, and one or more of which may be selected to form the packet header vector, including the commonly used MAC source and destination addresses, ethertype, IP source and destination addresses, IP protocol, TCP port numbers, VLAN and MPLS tags, etc., in addition to user defined extensible fields, and a metadata field to hold non-packet information. The input port ID is also provided as a match input.

An OpenFlow table is a content associative memory, that is, if the content is matched, the location at which the match occurs is reported or provided. In OpenFlow, this location therefore defines the corresponding action to be taken, typically by pointing to an address in an action memory that corresponds to the flow table just searched. Thus, OpenFlow actions, again associated with a packet that matches a flow table entry, are generally one or more instructions to perform various operations for the packet that matched the flow table row. The actions include setting values into any of the packet header's recognized fields, pushing and popping VLAN and MPLS tags, performing PBB encapsulations and decapsulations, miscellaneous operations such as modifying packet TTL or QOS. Actions can also include assigning the packet to an output port and queue, sending the packet to the controller 120, or dropping it. As OpenFlow is still a new and evolving standard, it is anticipated that implementers will create user defined extensions for any required capabilities not yet in the standard, such as other encapsulation types (GRE, NVGRE, VXLAN, etc.).

OpenFlow also defines "meters," which are a type of action executable on a flow table match used to measure data flow rates. A meter includes a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. Meter bands are often informally named with colors, such as green, yellow and red for a three color meter. Openflow provides for remarking the packet DSCP field as a result of overflowing the base band. This information might be used later to direct the packet to a different queue, where it may be more subject to delay or dropping in case of congestion.

OpenFlow also defines "statistics," which are another type of action that provides collecting counters. These counters may count various items, including packet and byte counters, for flow tables, flow table entries, groups and group buckets, meters and meter bands, input/output ports, and queues. While most statistics are optional, the information they provide is useful to implementers.

In some embodiments, the OpenFlow switch 140 and the controller 120 communicate with each other through a messaging protocol established by a standard. In some embodiments, such messages provide for initial configuration, set up, modification, or deletion of flow table, group and meter entries. Statistics information is in some embodiments requested by the controller and communicated back by the switch. Flow entries can, as an action, direct a packet to be sent to the controller 120, and the controller 120 can send packets back to the switch 140 for OpenFlow processing. If a packet is unexpectedly unmatched in a flow table, the packet is sent via the messaging protocol to the controller 120, which responds by installing flows into one or more switches. This implements the software-defined networking (SDN) canonical separation of data plane and control plane processing. Switch functionality, as the former, is confined to matching flows and taking the indicated actions, while any unrecognized pattern is sent up to the controller 120 which, as the latter, shoulders the responsibility for all high level decisions.

In some embodiments, improvements are provided in OpenFlow flow table architecture 145 as a unit that can be cascaded to implement the core of OpenFlow switch functionality: providing the flow tables, matching of packet fields against flow table entries, taking the actions indicated by the match, and collecting statistics, which may be perceived as a type of action but also involve modifying a value beyond the one in the packet header vector.

OpenFlow defines all tables with ternary matching capability; that is, each table bit can have the ternary values of 0, 1 or don't-care. Wildcarding bits allow a wide variety of packets to match a single table entry. At a performance level targeted of one packet per clock cycle, ternary match tables are implemented with ternary content addressable memory (TCAM) modules. Another useful type of table is an exact match table, where no wildcarding is allowed, and packets must exactly match table entries. In some embodiments, exact match tables are implemented in SRAM with the advantage of significantly less area. In some embodiments, some or all of the tables are as implemented as hash tables. Generally, hashing involves reducing the number of bits preliminary searched, by creating a smaller quantity of bits (i.e., the "hash") from the larger number of searchable bits, so as to reduce the search effort from having to search line-by-line and bit-by-bit in each table row.

Some embodiments provide a considerable amount of flexibility in dimensions and size to both match and action memories. In some embodiments, the switch 140 of FIG. 1 includes a pool, preferably arranged in an array, of what have been above and are hereafter referred to as unit memories, that is, a number of memories, where preferably each unit memory is of a same size (e.g., 112 bits by 1 k words; 137 bits by 1 k words). The unit memories may be constructed by techniques known or ascertainable to one skilled in the art, where a contemporary example would be for each unit memory to be an SRAM as is common for the form of on-chip memory in the art.

In some embodiments, the switch 140 may allocate from among the unit memory pool, for example, allocating a first number of unit memories for use as match memory (or exact match memory) and a second number of unit memories for use as action memory. Some embodiment provides the memory pool so as to flexibly apportion unit memories to more efficiently use them for either match or action memory. In some embodiments, the memory pool extends to including statistics and meters memories, in addition to what are referred to as "stateful" memories so as to accommodate stateful logic unit (e.g., implemented as an arithmetic logic unit ("ALU")). Some embodiments allocate the unit the memories in the memory pool to implement other types of memories such as statistics memories, meters memories, ternary indirection memories, and/or idle time memories, or other types of memories specified by the OpenFlow standard.

Some embodiments therefore allocates from the common memory unit pool to include some or all of the unit memories in the flexible allocation capability of memories for two or more of these tables/functions. For example, some embodiments extend action memory word width to the same 112 bits of match memory, yielding 96 bits of data plus 8 field-valid bits per unit memory (104 bits total), in addition to the 8 ECC bits. Some embodiments use 137 bits, yielding 120 bits of data plus 8 field-valid bits per unit memory in addition to 9 ECC bits.

Further descriptions of match-action packet processing (such as OpenFlow) and the various types of tables/logical memories can be found in U.S. Patent Application Publication No. 2014/0241361 and U.S. Patent Application Publication No. 2014/0241358. U.S. Patent Application Publication No. 2014/0241361 and U.S. Patent Application Publication No. 2014/0241358 are herein incorporated by reference.

Several more detailed embodiments of the invention are described below. Section I describes the pool of unit memories and its implementations. Section II describes dynamic allocation and reallocation of unit memories. Section III describes an electronic system with which some embodiments of the invention are implemented.

I. Pool of Unit Memories

As mentioned, some embodiments provide a pool of unit memories in order to flexibly allocate memory capacity to implement various tables and/or logical memories for performing match-action network packet switching, such as those performed by an OpenFlow switch, which uses match tables, action tables, statistics memories, meters memories, stateful memories, and ternary indirection memories, or other types of memories such as selector memories that allow hash-based load balancing across a pool of ports. However, flexibility in unit memory assignment generally requires routing resources that result in larger circuit area and more power consumption. It is therefore important to identify the optimum level of flexibility and to commit only the routing resources that are needed for implementing the identified level of flexibility.

Figure 3:
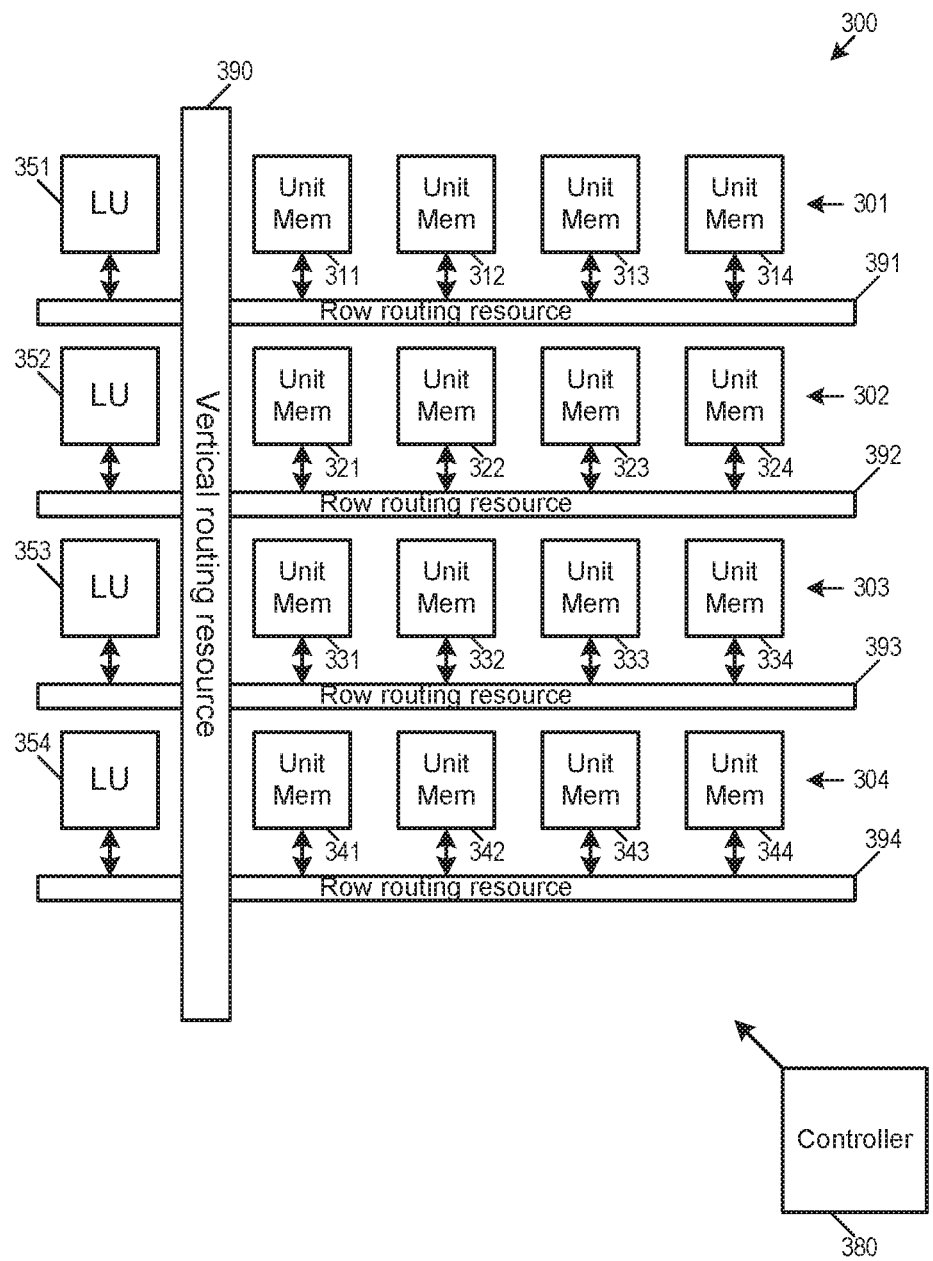
FIG. 3 illustrates a pool of unit memories for implementing the various tables for packet operations.

FIG. 3 illustrates a pool 300 of unit memories for implementing the various tables for packet operations such as those specified under OpenFlow. The pool 300 is structured with routing resources for allowing flexible allocation of memory capacity to the various tables. As illustrated, the pool 300 includes unit memories 311-314, 321-324, 331-334, and 341-344. The pool 300 also includes logical units (LUs) 351-354. One skilled in the art would understand that the size of the pool 300 is chosen for illustration only. The discussion with reference to FIG. 3 and subsequent figures apply to memory pools of different sizes as well (i.e., with additional rows/LUs and/or additional unit memories per row).

The unit memories and the logical units in the pool 300 are interconnected by a set of horizontal routing resources 391-394 and a set of vertical routing resources 390. The unit memories in the pool 300 are organized into rows 301-304 that corresponds to the horizontal routing resources 391-394 respectively. In other words, each row of unit memories is directly coupled to the horizontal routing resource of that row. The horizontal routing resources 391-394 are in turn interconnected by the vertical routing resources 390. As illustrated, the unit memories 311-314 are in the row 301 and directly coupled to the horizontal routing resource 391. The unit memories 321-324 are in the row 302 and directly coupled to the horizontal routing resource 392. The unit memories 331-334 are in the row 303 and directly coupled to the horizontal routing resource 393. The unit memories 341-344 are in the row 304 and directly coupled to the horizontal routing resource 394.

The LUs 351-354 can access the unit memories in the pool 300 through the vertical and horizontal routing resources 390-394. In some embodiments, a flow table or a logical memory is implemented by an LU and a group of unit memories in the pool that are assigned to the LU. In some of these embodiments, the LU of a flow table uses the routing resources to read and/or write the unit memories in the group (i.e., unit memories that are assigned to the flow table).

In some embodiments, each LU corresponds to a row. Each LU is directly coupled to the horizontal routing resource of its corresponding row and has direct access to unit memories of that row through the row's horizontal routing resource. For example, the LU 352 is directly coupled to the row 302 and has direct access to unit memories 321-324. Each LU is also able to access unit memories that are not on the LU's own row by going through the vertical routing resources 390. For example, the LU 351 can use the vertical routing resources 390 and the horizontal routing resource 394 to access the unit memory 344.

However, the vertical routing resources 390 is a shared resource that is finite in capacity, i.e., it can only accommodate a limited number of LU to unit memory accesses at one time. On the other hand, each row's horizontal routing resource has a dedicated wiring for the LU of the row. Thus, in some embodiments, an LU directly coupled to a row (i.e., local to the row) is able to access the unit memories of that row without having to go through the vertical routing resources 390, which may be congested or otherwise taken up by LUs on other rows.

In some embodiments, some or all of the logical units are arithmetic logical units (ALUs). In some embodiments, the LUs perform the necessary computations for implementing the tables specified by OpenFlow (e.g, match, action, statistics, meter, etc.). In some embodiments, LUs for implementing different types of tables perform different types of computations. For example, an LU 351 can be for implementing an action table while the LU 352 can be for implementing a statistics memory. In some embodiments, at least some of the LUs have different types of hardware for implementing different types of tables. In some embodiments, the LUs in the pool 300 are physically identical to each other but can be configured or programmed to perform different functions and implement different types of tables.

In some embodiments, the allocation of unit memories is implemented by configuration of routing resources. Specifically, the routing resources are configured to allow each LU unobstructed access to its unit memories (i.e., the unit memories assigned to the logical memory/table using the LU). In the example of FIG. 3, the vertical and horizontal routing resources 390-394 are configured by control signals issued by a controller 380. In some embodiments, the control signals issued by the controller 380 controls various multiplexers in the routing resources for selecting between different data paths or buses. In some embodiments, the control signals also controls the connection between the unit memories and the routing resources.

In some embodiments, a single LU can be shared by multiple mutually exclusive match tables. Here, mutually exclusive means that, based on the outcomes of 2 or more match tables, only one of them will ever execute its associated actions given a parse-graph of the packet switching pipeline. Multiple match tables can share LUs and their associated RAM contents allowing for flexibility in sharing of RAM/LU resources between match tables when mutual exclusivity is adhered to. In some embodiments, multiple mutually exclusive match tables that use disparate sets of RAMs share an LU by separating the address space of the RAMs. This is useful when LU's are the scarce resource. In some of these embodiments, only one match table executes and broadcasts its address to all of the RAMs associated with all of the tables, then address decode results in the correct RAM being read and sending its read data to the LU.

Figure 4:
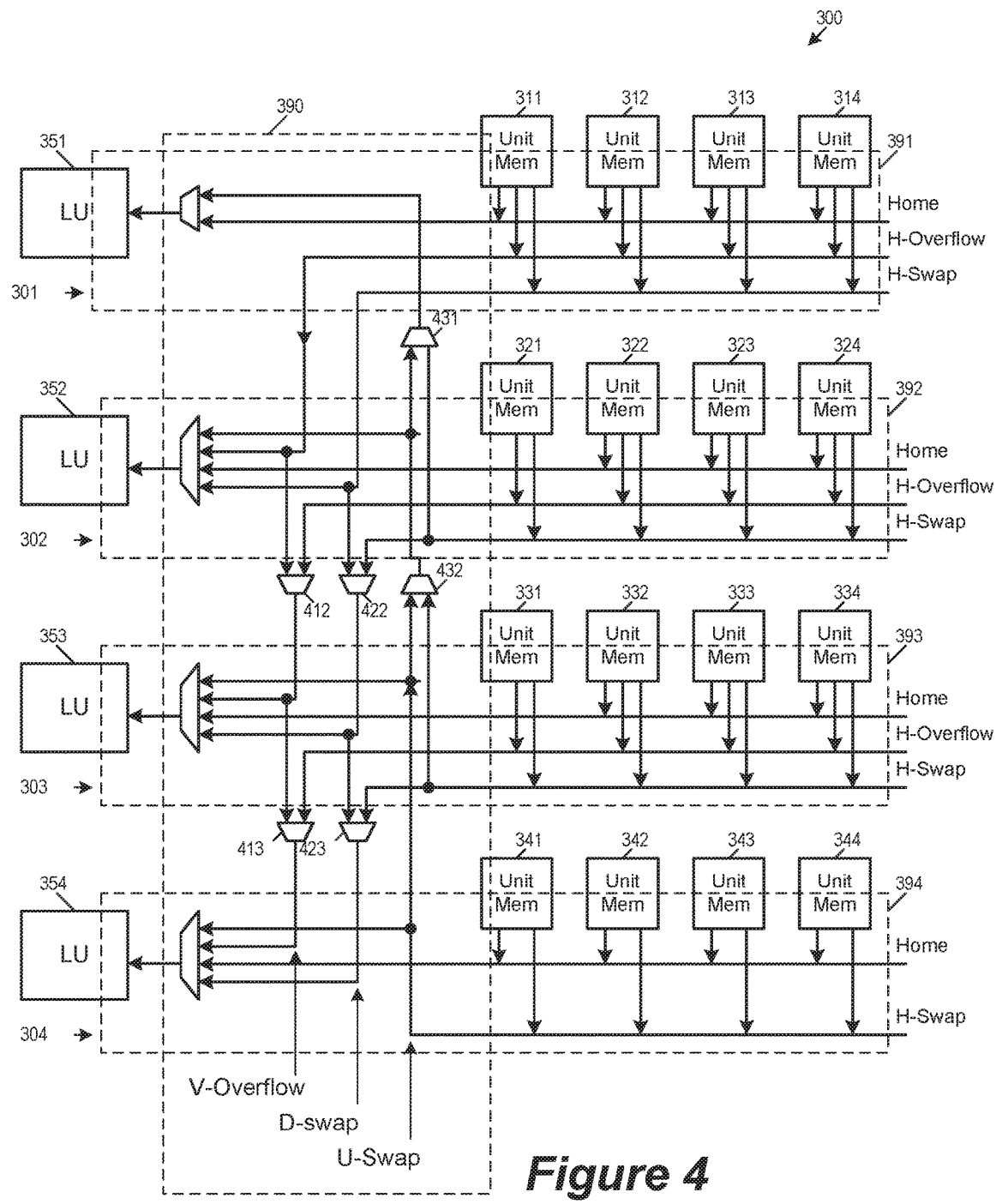
FIGS. 4-5 further illustrate the vertical and horizontal routing resources for connecting LUs and unit memories.
Figure 5:
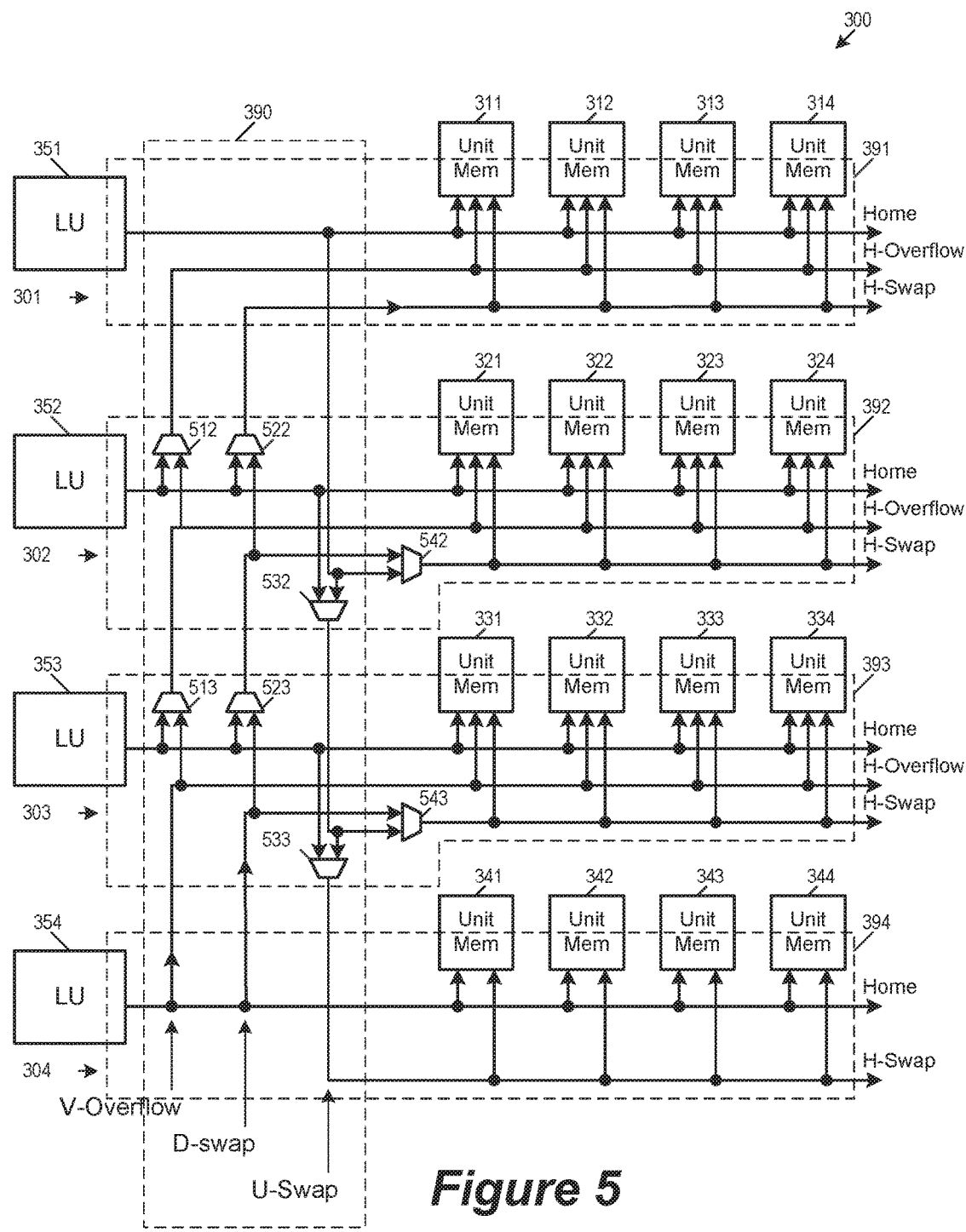

For some embodiments, FIGS. 4-5 further illustrate the vertical and horizontal routing resources for connecting LUs and unit memories. As mentioned, the vertical and horizontal routing resources provide paths for the LUs to read data from and/or write data to the unit memories. As illustrated, the horizontal routing resource of each row comprises three buses: a home row bus (Home), a horizontal overflow bus (H-overflow), and a horizontal swap bus (H-swap). The vertical routing resources 390 comprises three buses: a vertical overflow bus (V-overflow), a down-swap bus (D-swap), and an up-swap bus (U-swap). Each of these buses comprises a read path for transporting read data from the unit memories to the LUs and a corresponding write path for transporting write data from the LUs to the unit memories.

FIG. 4 illustrates the read paths of Home, H-overflow, H-swap, V-overflow, D-swap, and U-swap buses. Each LU of a row receives read data from (1) the home read path of its row, (2) the V-overflow read path, (3) the D-swap read path, and (4) the U-swap read path.

The home row bus of each row (i.e., the horizontal routing resource of each row) in some embodiments directly connects the LU of that row with unit memories of that row. The read path of the home row bus allows the unit memories of that row to be read by the LU of that row without having to go through the vertical routing resources 390. For example, the home read path of the row 303 allows the LU 353 to directly access the unit memories 331-334, since those unit memories are on the same row as the LU 353.

The H-overflow bus of each row is in some embodiments connected to the V-overflow bus in the vertical routing resources 390. The read path of H-overflow of each row merges into the read path of V-overflow, which is a unidirectional data path bringing data from the top-most row (i.e., the row 301) to the bottom-most row (the row 304). In some embodiments, V-overflow read path includes multiplexers at each row (e.g., multiplexer 412 for the row 302 and the multiplexer 413 for the row 303) for selecting between the read data from unit memories of that particular row and the read data from the unit memories of rows that are above that particular row. This allows the H-overflow read path of each row, together with the V-overflow read path, to provide read access of the unit memories on the row to LUs below that row. It should be noted that, in this document and for some embodiments, the term "rows above a particular row" is used to refer to rows that are at one side or direction of that particular row. In other words, such "rows above a particular row" can be rows that are physically above, below, to the right, to left, etc., of the particular row.

It should be noted that, since multiple memories on different rows are connected to an LU for a given configuration, a read path from RAMs on multiple rows to an LU exists for a given configuration. Thus the multiplexers dynamically switch, depending which RAM is being read and having its data being sent to LU. In some embodiments, the multiplexers are disembodied into AND-OR structures where each bus is AND'ed with its own configurable control and then OR'ed with the other buses. Address decoding guarantees that only one RAM drives its read data to the LU at a time. In some embodiments, the multiplexers do not actually dynamically switch. Instead, the multiplexer are controlled from local configuration registers and do not require critical timing paths on their high fan-out control distributed through the vertical routing resources. A separate control fabric distributes critical timing information to determine which RAM is read/written.

The H-swap bus of each row is connected to both the U-swap bus and the D-swap bus of the vertical routing resources 390. As illustrated, the H-swap read path of each row merges into the U-swap read path, which is a unidirectional data path bringing data from the bottom most row (304) to the top most row (301). In some embodiments, the U-swap read path includes multiplexers at each row (e.g., multiplexers 431-432 respectively for the rows 301-302) for selecting between the read data from unit memories of that particular row and the read data from the unit memories of rows that are below that particular row. The H-swap read path of each row also merges into the D-swap read path, which is a unidirectional data path bringing data from the top most row (301) to the bottom most row (304). In some embodiments, the D-swap read path includes multiplexers at each row (e.g., multiplexer 422 for the row 302 and the multiplexer 423 for the row 303) for selecting between the read data from unit memories of that particular row and the read data from the unit memories of rows that are above that particular row. This allows the H-swap read path of each row, together with the U-swap and D-swap read paths, to provide read access of the unit memories on the row to LUs above or below that row.

As mentioned, the V-overflow read path, the D-swap read path and the U-swap read path include multiplexers at each row for selecting between read data of previous row and read data of its own row. These multiplexers in some embodiments serve to partition these vertical read paths into sections that can be used by different LUs simultaneously. For example, the multiplexer 412 allows the V-overflow path above it to be used by the LU 352 while allowing the V-overflow path below it to be used by the LU 353 or 354. The partitioning by the multiplexers in the vertical read paths (V-overflow, U-swap, and D-swap) allows each LU to receive read data from its own sections of the vertical read paths. For example, the LU 352 receives read data from V-overflow before the multiplexer 412, from D-swap before the multiplexer 422, and from U-swap after the multiplexer 432, while the LU 353 receives read data from V-overflow before the multiplexer 413, from D-swap before the multiplexer 423, and from U-swap before multiplexer 432.

It is worth noting that the figure shows optimizations of logic at the top most row 301 and the bottom most row 304. For example, the read data from the H-overflow of the row 301 does not need a multiplexer to merge into the V-overflow, since the row 301 is the top most row and there is no read data from any previous row.

FIG. 5 illustrates the write paths of Home, H-overflow, H-swap, V-overflow, D-swap, and U-swap buses. Each LU sends write data to its unit memories through (1) the home write path of its row, (2) the V-overflow write path, (3) the D-swap write path, and (4) the U-swap write path. As shown in the figure, the write paths of each bus carries write data in the opposite direction of read data carried by the bus's read path.

The write path of the home row bus allows the LU of a row to write data to the unit memories of that row without having to go through the vertical routing resources 390. The V-overflow write path and the H-overflow write paths allow a LU to write to unit memories at rows above the LU. The D-swap write path and the H-swap write paths allow a LU to write to unit memories at rows above the LU. The U-swap write path and the H-swap write paths allow a LU to write to unit memories at rows below the LU. The H-swap write path of a row is shared by the D-swap write path and the U-swap write path for accessing the unit memories of the row. (The multiplexer 542 selects between D-swap and U-swap for the row 302, and the multiplexer 543 selects between D-swap and U-swap for the row 303).

Analogous to the read paths, the write paths are also unidirectional data paths for carrying write data in vertical direction. Specifically, V-overflow and D-swap write paths carry write data from the bottom most row (304) toward the top most row (301), and the U-swap write path carries write data from the top most row to the bottom most row. Like the vertical read paths, the vertical write paths also include multiplexers for merging in write data from the LU of each row. Specifically, multiplexers 512, 522, and 532 are for merging data from the LU 352 into the write paths of V-overflow, D-swap, and U-swap, respectively, and multiplexers 513, 523, and 533 are for merging data from the LU 353 into the write paths of V-overflow, D-swap, and U-swap, respectively. For a given write path, a multiplexer of a row selects between the write data from the LU of the row and write data from its previous rows to produce write data for its next row. In some embodiments, similar to the read path, the multiplexers of write paths are disembodied into AND-OR structures such that an LU broadcasts its write data to all memories connected to it through the horizontal/vertical resources as configured, and address decoding determines which RAM is written for a given access. Multiplexers for the border rows (301 and 304) are optimized off. As in the read path, the multiplexers in the write path serve to partition these vertical write paths into sections that can be used by different LUs simultaneously.

The routing resources illustrated in FIGS. 4 and 5 provides a great deal of flexibility in allocation of memory capacity while requiring a very limited amount of circuitry. Through the use of V-overflow, D-swap, U-swap, H-overflow, H-swap, and home buses, a LU in the memory pool is able to access unit memories at its home row as well as unit memories at other rows. Furthermore, through partitioning of the vertical routing resources, multiple LUs are able to use the vertical routing resources to access unit memories on rows different than themselves.

Figure 6A:
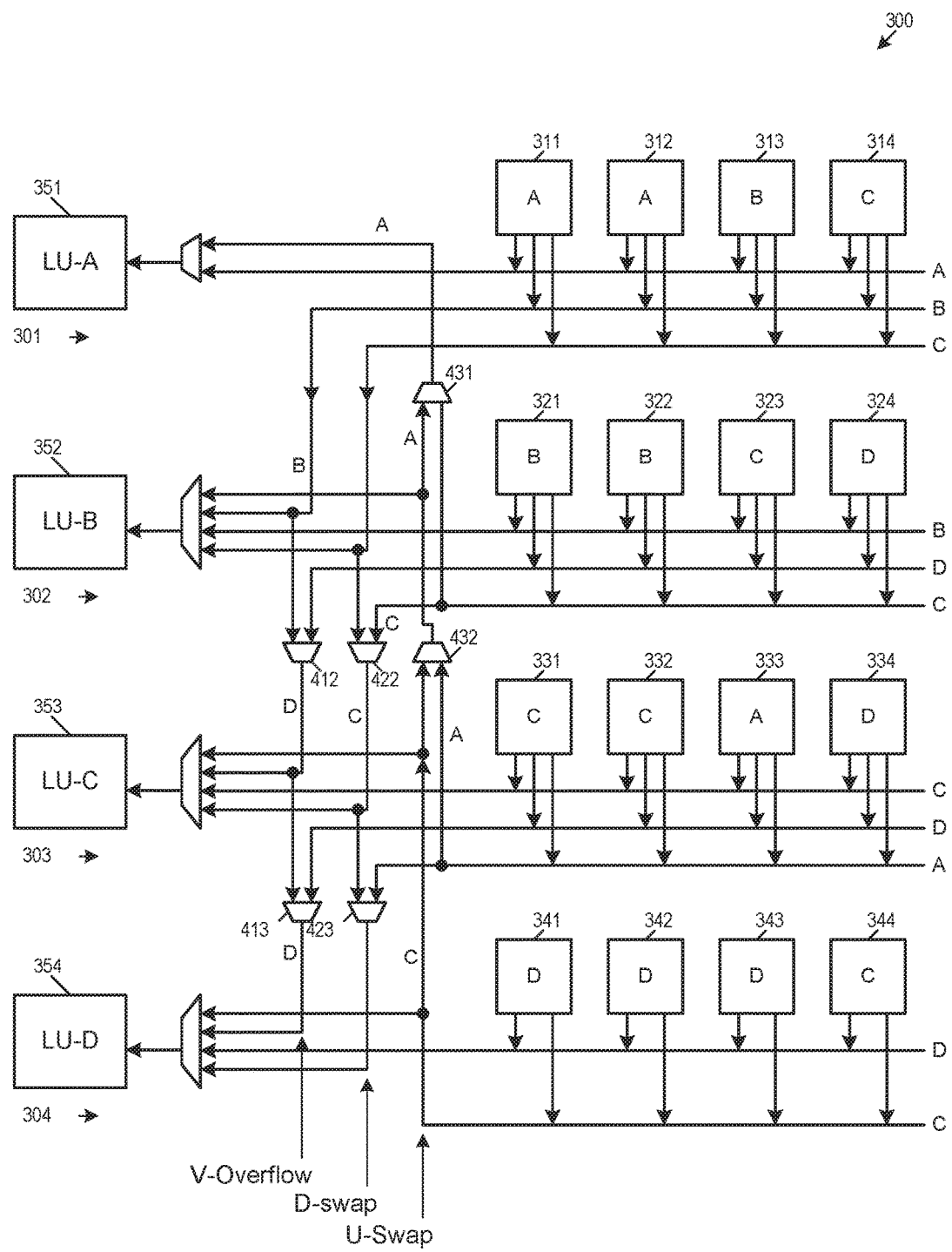
FIG. 6a illustrates the configuration of the read paths of the vertical and horizontal routing resources.
Figure 6B:
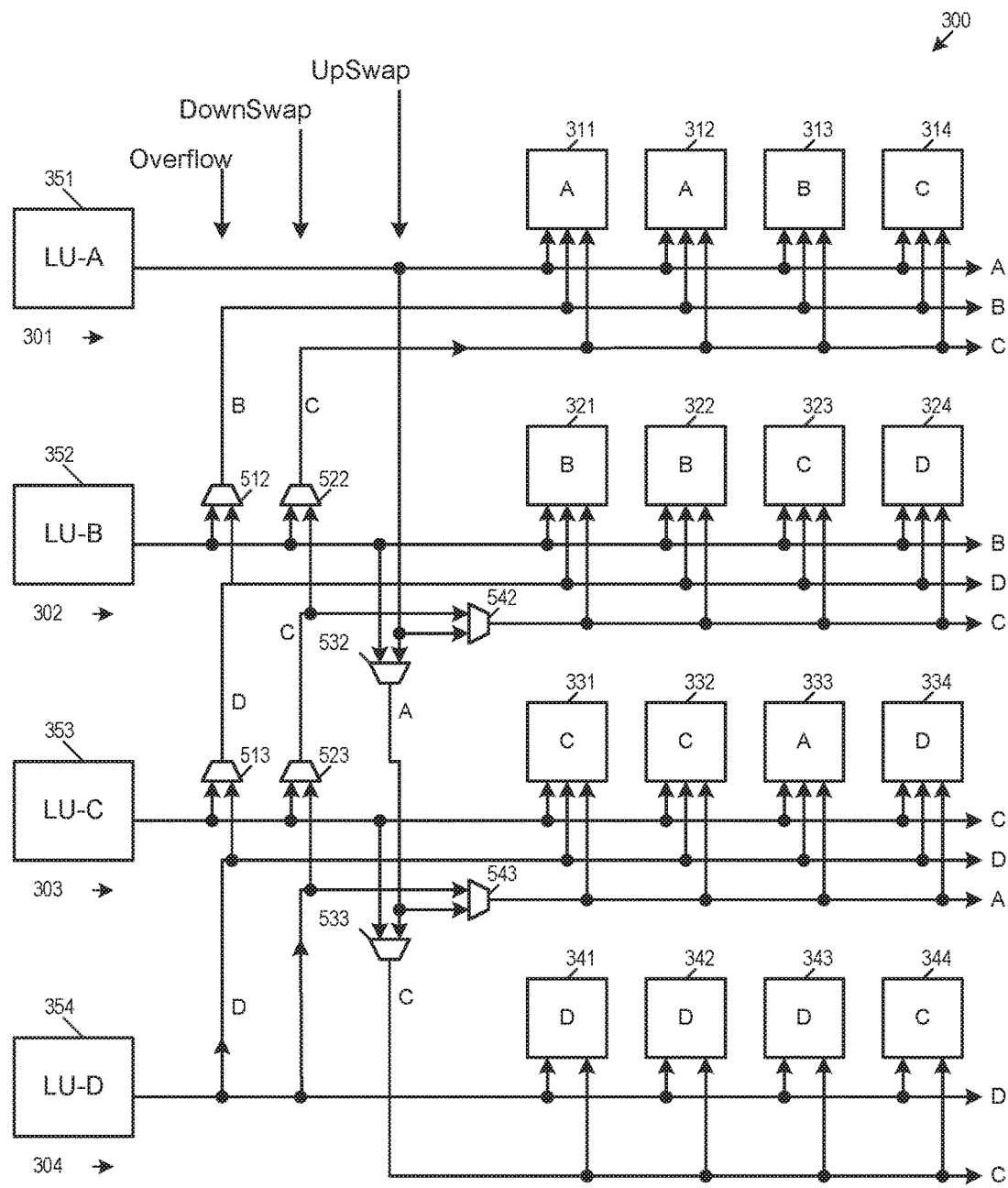
FIG. 6b illustrates the configuration of the write paths of the vertical and horizontal routing resources.

FIGS. 6a-b illustrates an example unit memory allocation that is implementable by using the vertical and horizontal routing resources introduced by FIGS. 4 and 5. As illustrated, LUs 351-354 are assigned to tables (or logical memories) A, B, C, D, respectively. Unit memories in the pool are likewise assigned to those tables. Specifically, unit memories 311, 312, 333 are assigned to table A. Unit memories 313, 321, 322 are assigned to table B. Unit memories 314, 323, 331, 332, and 344 are assigned to table C. Unit memories 324, 334, 341, 342, 343 are assigned to table D.

The vertical and horizontal routing resources are in turn configured to allow the LU of each table read and write access to each of the unit memories assigned to the table. FIG. 6a illustrates the configuration of the read paths of the vertical and horizontal routing resources, while FIG. 6b illustrates the configuration of the write paths of the vertical and horizontal routing resources.

A LU has guaranteed read/write access to unit memories of its own row by using its own home bus. The LU can access unit memories in rows above itself by using V-overflow bus and the D-swap bus. The LU can access the unit memories in rows below itself by using the U-swap bus. For example, the LU of table C (the LU 353 of row 303) is allocated memories in row 302 (unit memory 323) above itself and in row 304 (unit memory 344) below itself, in addition to unit memories (331-332) at its own home row 303.

Each row of unit memories is coupled to three different buses (home, H-overflow and H-swap) in the horizontal routing resource of its row. Each of these buses can be configured to connect to a different LU. The home bus connects the unit memories of the row to the LU of the row. The H-overflow bus of the row connects the unit memories to an LU below the row via the V-overflow bus. The H-swap bus of the row connects unit memories to an LU at a different row (above or below) than the current row via either the D-swap bus or the U-swap bus. Consequently, unit memories of a row can be allocated to up to three different LUs (a first LU at the same row as the unit memories, a second LU at a row below the unit memories, and a third LU at a row above or below the unit memories). For example, the unit memories 331-334 of the row 303 are allocated to three different LUs in three different rows (LU-A, LU-C, and LU-D).

The vertical routing resources are partitioned by multiplexers. A multiplexer at a row selects between read/write data being merged in from that row and read/write data being transported in from previous rows. Consequently, one vertical bus can be configured to transport data for several LUs, the traffic for different LUs segregated by multiplexers. As illustrated, the multiplexers 412 and 413 of the V-overflow read path and the multiplexers 512 and 513 of the V-overflow write path are configured to allow both the LU 352 (LU-B) and the LU 354 (LU-D) to simultaneously use the V-overflow bus to access their own unit memories. One vertical bus can also be configured to transport data from the top most row to the bottom most row (or vice versa) for one LU. (As illustrated, the multiplexers 422, 423, 522, and 523 are configured so that only the LU-C is using the D-swap bus).

Figure 7:
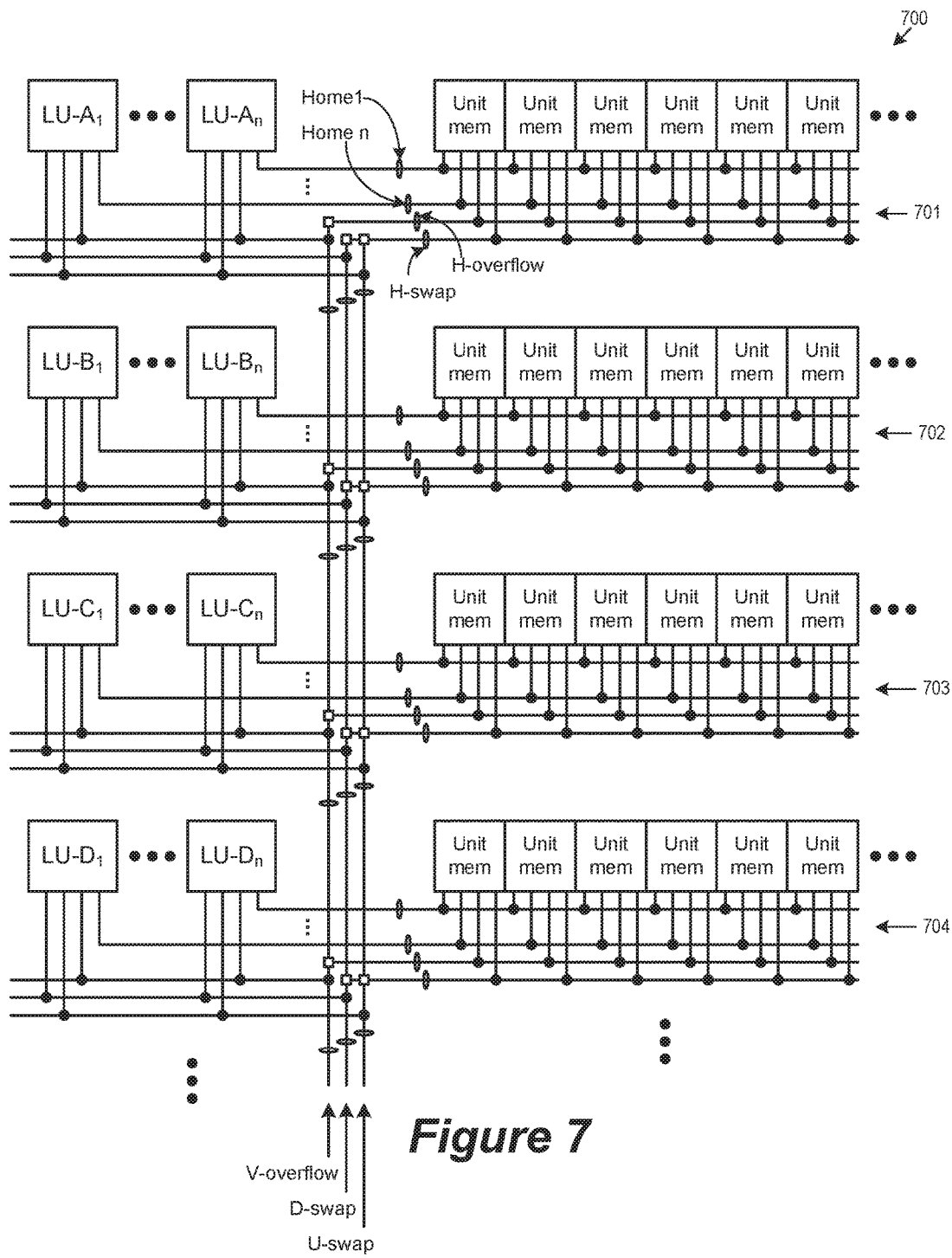
FIG. 7 illustrates a general case pool of unit memories in which each row has multiple LUs.

In the pool 300 of unit memories as illustrated in FIGS. 3-6, there is only one LU for each row of unit memories. In some embodiments, each row can have multiple LUs. FIG. 7 illustrates a general case pool of unit memories 700 in which each row has multiple LUs. For purpose of illustrative simplicity and clarity, FIG. 7 and subsequent figures depicts each horizontal bus (home, H-overflow, or H-swap) and each vertical bus (V-overflow, D-swap, or U-swap) as a single line. However, one of ordinary skill would understand that each such single line depicting a horizontal bus or a vertical bus represents both the read path and the write path of the illustrated bus.

As illustrated, the pool 700 has rows 701-704. Each row has multiple LUs (n LUs labeled 1 through n). Specifically, the row 701 has LUs labeled LU-$A_1$ through LU-$A_n$, the row 702 has LUs labeled LU-$B_1$ through LU-$B_n$, the row 703 has LUs labeled LU-$C_1$ through LU-$C_n$, and the row 704 has LUs labeled LU-$D_1$ through LU-$D_n$. Within each row, each LU of the row has its own home row bus for accessing the unit memories of the row. As illustrated, each row has n home row buses (labeled "Home1" through "Home n") that serve as corresponding home row busses for the n LUs of the row (LU$_1$ through LU$_n$) of the row.

However, in some embodiments, there is still only one H-overflow bus and one H-swap bus per row. These horizontal routing resources are shared by all of the LUs of the row. In other words, for each row, only one LU can use the H-overflow bus to access unit memories above the row (via V-overflow) and only one LU can use the H-swap bus to access unit memories above or below the row (via D-swap or U-swap).

Though FIG. 7 illustrates multiple LUs per row, in some embodiments, multiple LUs can be tied to the same set of RAMs where only a single LU executes, depending on the outcome of the match tables. Having multiple LUs tied to the same set of RAMs allows different types of logical operations to be performed on the same pool of RAMs tied to multiple LUs on the same home row through the routing resources. For example, to support LAGs/ECMP, an LU can implement fair/resilient hashing for load balancing across a pool of ports. As ports in the system come up or go down, the selector table is updated to reflect the correct state. This can be supported in the data plane by tying a stateful LU to the same set of RAMs. In some of these embodiments, something else in the system (e.g., a MAC detecting downed port) triggers a packet to be issued which causes a match table to execute the stateful LU to bring ports up and down in the selector table. Another mutually exclusive match table implements ECMP/LAG load-balancing using the selector LU tied to the same set of RAMs.

II. Dynamic Re-Allocation Unit Memories

In the unit memory allocation example of FIGS. 6a and 6b, the routing resources of the pool 300 are completely used up. In other words, one cannot reallocate a unit memory without freeing up some of the routing resources first. Some embodiments therefore provide constraints upon memory placement algorithms to allow as much flexibility in allocation as possible while leaving at least some of the routing resources available for future re-allocations.

Figure 8:
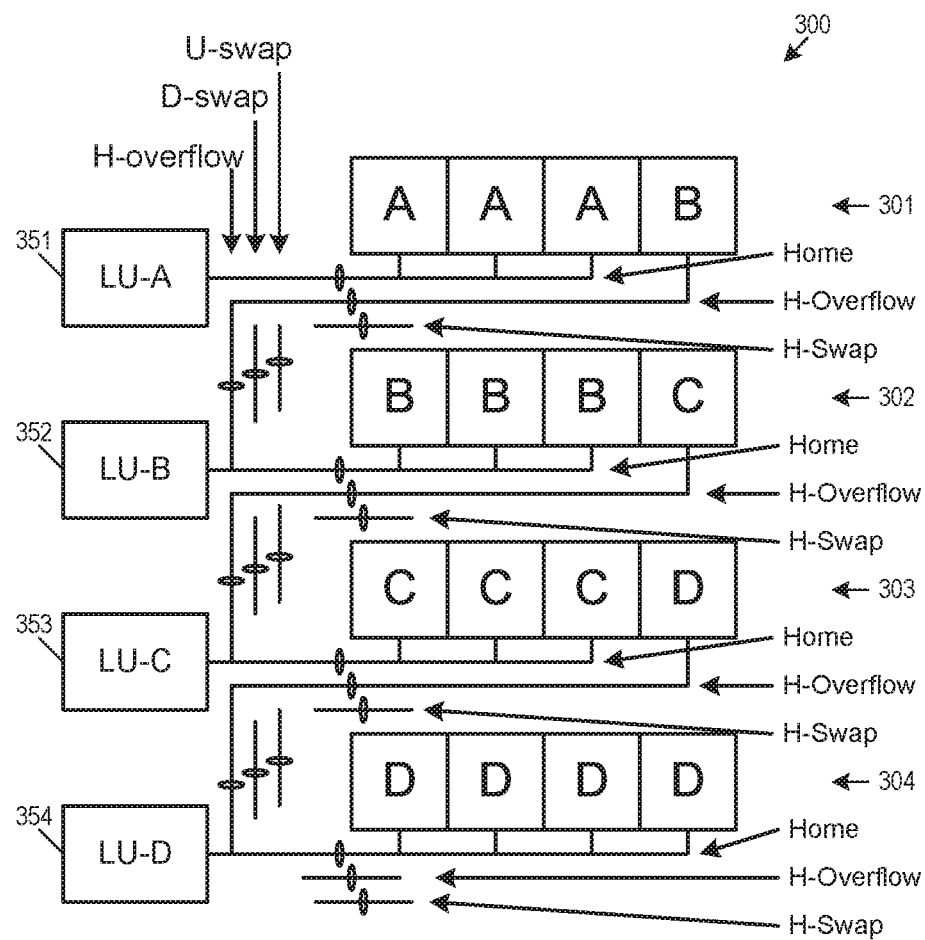
FIG. 8 illustrates an example memory allocation configuration in a memory pool according to a set of constraints that leaves routing resources available for subsequent re-allocation operations.

FIG. 8 illustrates an example memory allocation configuration in the memory pool 300 according to a set of constraints that leaves routing resources available for subsequent re-allocation operations. The memory allocation configuration is based on the following set of constraint: (1) each row of unit memories shall be assigned to no more than two different LUs (or tables); (2) each LU shall only be allocated unit memories at its home row or above.

As illustrated, the unit memories of the row 301 (top most row) are allocated to LU-A and LU-B only. The unit memories of the row 302 are allocated to LU-B and LU-C only. The unit memories of the row 303 are allocated to LU-C and LU-D only. The unit memories of the row 304 (bottom most row) are allocated to LU-D only. Each of the LUs 351-354 (LUs A, B, C, and D) as a result is assigned only unit memories of their own row or above.

This unit memory allocation allows at least some of the vertical and horizontal routing resources to remain available. As illustrated, the D-swap, U-swap, and H-swap buses are all unused. This is because constraints (1) renders the D-swap bus unnecessary (V-overflow and H-overflow can be used for access rows above the home row), and constraint (2) forbids the use of the U-swap bus (which allows each LU to communicate with unit memories below its home row). Consequently, H-swap bus need not be used, either. These available routing resources can then be used to maneuver the unit memory allocations during dynamic reallocation operations.

In some embodiments, reallocation of memory capacity is performed while the pool of memory is actively being used as tables or logical memories for packet forwarding operations. Examples of such dynamic reallocations include growing a table or logic memory by allocating additional unit memories to the table, shrinking a table or logic memory by de-allocating unit memories from the table, and reallocating a unit memory from a first table to a second table. Some of these dynamic reallocation operations require moving memory content from one unit memory in one row to another unit memory in another row.

Figure 9:
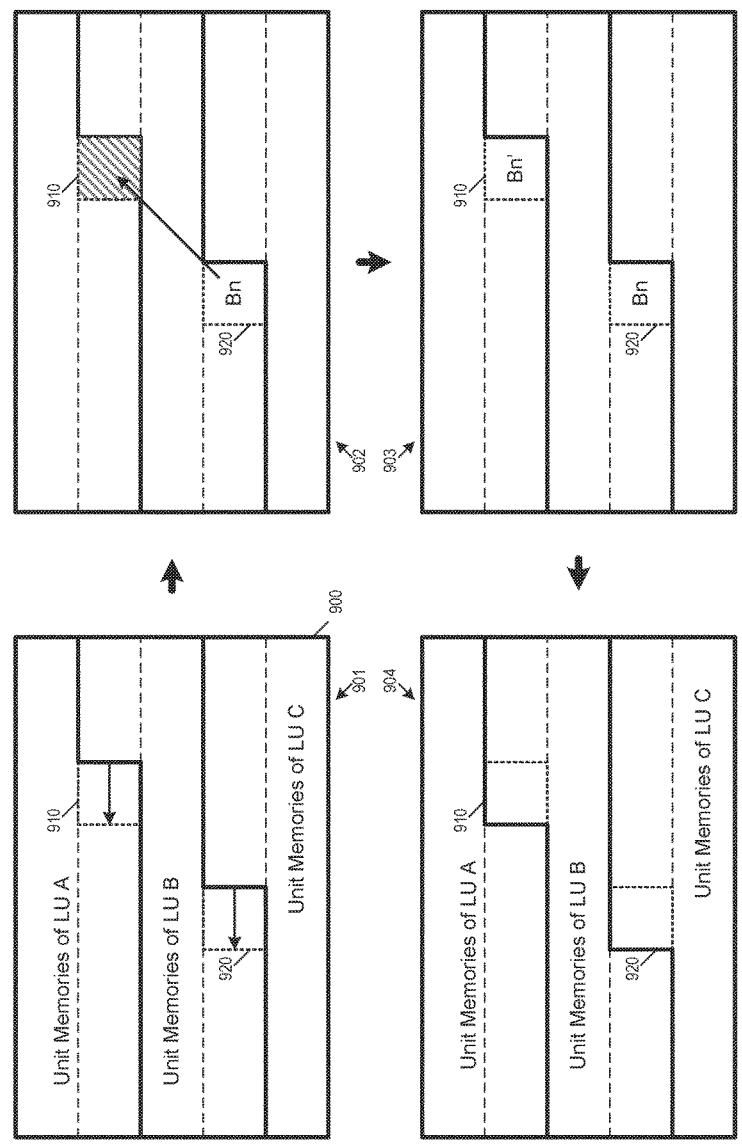
FIG. 9 conceptually illustrates a dynamic memory reallocation operation in a pool of memories.

FIG. 9 conceptually illustrates a dynamic memory reallocation operation in a pool of memories 900. The pool of memory 900 includes unit memories that are assigned to LUs for implementing tables A, B, and C (LU-A, LU-B, and LU-C). The figure shows the memory reallocation operation in four stages 901-904.

The first stage 901 shows the initial allocation of unit memories to the different tables. As illustrated, the unit memories assigned to LU-A (Table A) occupies top most rows. The unit memories assigned to LU-C (Table C) occupies the bottom most rows. The unit memories assigned to LU-B (Table B) occupies rows in the middle, separating unit memories assigned to LU-A from those assigned to LU-C.

The first stage also conceptually depicts a planned dynamic reallocation operation in which table A shrinks by one unit memory while table C grows by one unit memory. This is necessary if, for example, Table C needs additional memory capacity but only Table A has memory capacity to spare, and Table B needs all of its allocated unit memories. While it is possible to directly reallocate a unit memory in Table A to Table C, such a reallocation would consume more vertical routing resources (e.g., D-swap or U-swap) in some embodiments, since the LU of C would have to use multiple partitions of V-overflow bus or D-swap bus to reach its newly allocated unit memory. It is preferable in some embodiments to reallocate unit memories in such a way that complies with the constraints set forth by reference to FIG. 8 above in order to consume less vertical routing resources.

As illustrated, the system plans to have Table A to donate a unit memory 910 to Table B and have Table B to donate a unit memory 920 to Table C. Since Table B and Table C reside in neighboring rows (and share a row), reallocating a unit memory from Table B to Table C would not consume additional vertical routing resources. Likewise, since Table A and Table B reside in neighboring rows (and share a row), reallocating a unit memory from Table A to Table B would not consume additional vertical routing resources.

The second stage 901 shows a memory content copying operation from the unit memory 920 to the unit memory 910. The unit memory 920 is initially allocated to Table B and is actively being used by LU-B. The unit memory 910 is allocated to Table A, but is no longer actively used by LU-A. In some embodiments, a controller copies the content of unit memory 920 (illustrated as Bn) to the unit memory 910 while LU-B is actively accessing the unit memory 920. The copy data override the content of the unit memory 920 without interrupting the operation of LU-A since it is no longer used by LU-A. In some embodiments, once a word has been copied from the unit memory 920 to the unit memory 910, the word will always be read/written from the unit memory 910.

The third stage 903 shows the end of the memory content copying operation. As illustrated, the content of 920 is completely replicated at 910 (illustrated as Bn') and thus the unit memory 910 is ready to take over for unit memory 920.

The fourth stage 904 shows the completion of the memory allocation. The controller reconfigures routing resources such that the unit memory 910 becomes accessible only to LU-B and the unit memory 920 become accessible only to LU-C. Consequently, Table C grows by one unit memory by gaining 920 and Table A shrinks by one unit memory by losing 910, while Table B remain logically unchanged as unit memory 910 replaces the unit memory 920. In some embodiments, the controller reconfigures the vertical and horizontal routing resources in the pool 900 by changing its control signals to the routings resources. Some embodiments accomplish this without interruption to the packet operations (e.g., OpenFlow) based on the tables using unit memories provided by the pool 900.

FIG. 9 illustrates a dynamic memory reallocation operation that involves the reassignment of one unit memory. In some embodiments, entire logical memory (i.e, all unit memories assigned to a table) has to be moved in order to make room for the necessary reallocation. In some of these embodiments, moving logical memories involves reassigning unit memories, copying content of unit memories, and reconfiguring the vertical and horizontal routing resources of one unit memory at a time as described above. In some embodiments, such movement necessarily violates the constraints for minimizing routing resource usage and therefore requires the use of additional vertical routing resources (e.g., U-swap and D-swap).

Figure 10A:
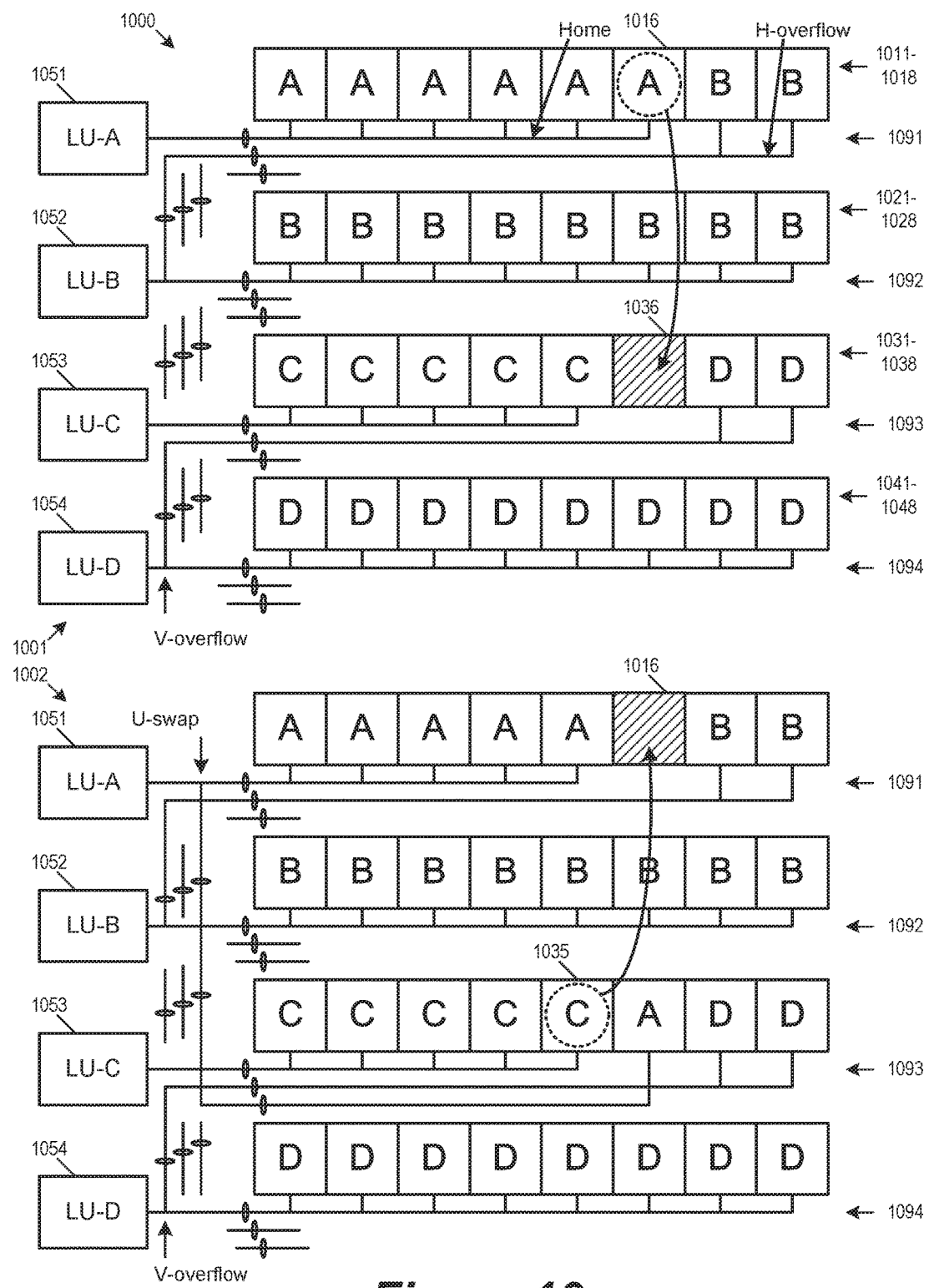
FIGS. 10a-c illustrates dynamic memory reallocation operation that involves moving an entire logical memory (table) in a pool of memories.
Figure 10B:
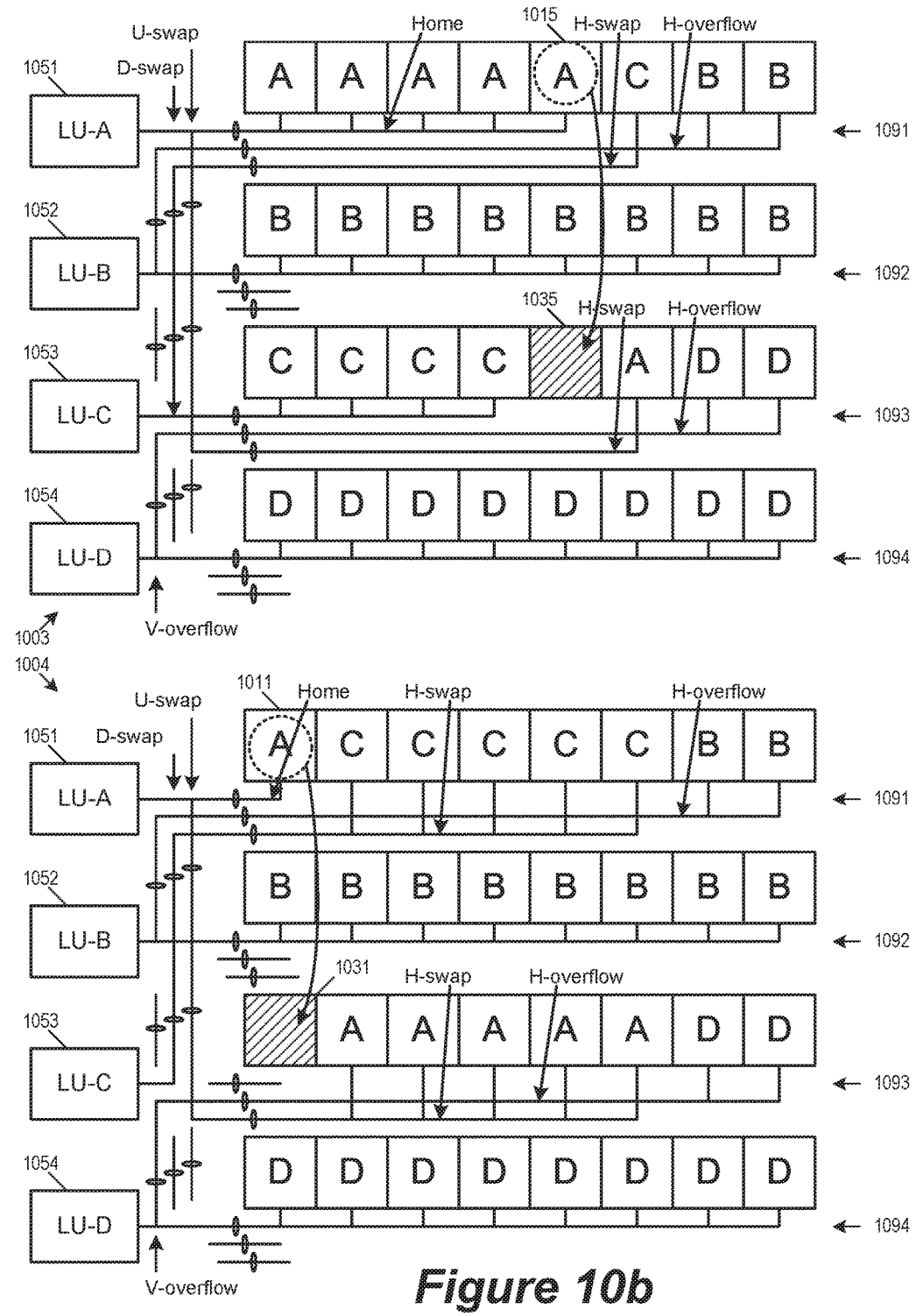
Figure 10C:
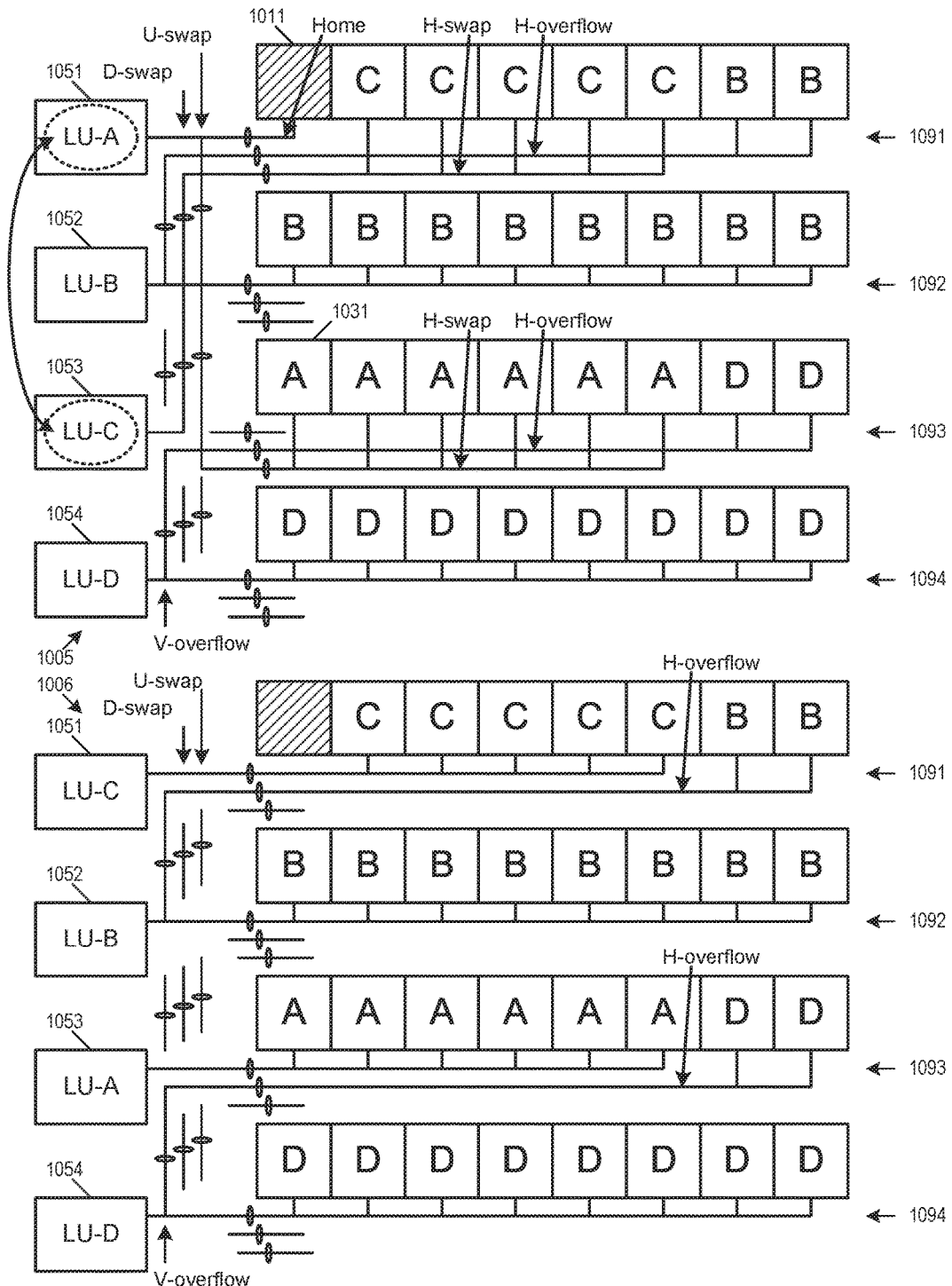

FIGS. 10a-c illustrates dynamic memory reallocation operation that involves moving an entire logical memory (table) in a pool of memories 1000. As illustrated, the pool of memories 1000 has four rows 1091-1094 of unit memories and four LUs. The row 1091 includes unit memories 1011-1018 and is the home row of LU 1051 (LU-A). The row 1092 includes unit memories 1021-1028 and is the home row of LU 1052 (LU-B). The row 1093 includes unit memories 1031-1038 and is the home row of LU 1053 (LU-C). The row 1094 includes unit memories 1041-1048 and is the home row of LU 1054 (LU-D). Each row has horizontal routing resources that include a home row bus for its home row LU, in addition to a H-overflow bus and a H-swap bus. The pool 1000 also includes vertical routing resources V-overflow, D-swap, and U-swap buses for interconnecting the horizontal routing resources of the different rows and to allow LUs of the pool to access unit memories at different rows. As illustrated, the unit memories of the pool are allocated to Table A (unit memories 1011-1016), Table B (unit memories 1017-1018 and 1021-1028), Table C (unit memories 1031-1035), and Table D (unit memories 1037-1038 and 1041-1048). FIG. 10a-c illustrates a memory reallocation operation in which Table A and Table C swap locations in the pool 1000 in six stages 1001-1006.

The first stage 1001 shows the initial memory allocation of the Tables A, B, C, and D. As illustrated, this initial allocation complies with the constraints for minimizing routing resource usage, namely (1) each row of unit memories shall be assigned to no more than two different LUs (or tables); (2) each LU shall only be allocated unit memories at its home row or above. Consequently, only Home, H-overflow and V-overflow buses are needed for connecting LUs with their assigned unit memories. H-swap, D-swap, and U-swap bus are not needed and therefore, remain available. The first stage 1001 also shows a planned movement from unit memory 1016 (belonging to table A) to the unit memory 1036 (unused). The movement would replace 1016 with 1036 as a unit memory of Table A.

The second stage 1002 shows the result of the movement from unit memory 1016 to 1036. The content of the unit memory 1016 has been copied to the unit memory 1036 such that the unit memory 1036 is the now in Table A while unit memory 1016 has become available. The routing resources of the pool 1000 have also been reconfigured in order to ensure that the LUs continue to have access to their unit memories. Since one of the unit memories for LU-A has been moved to a different row than the LU-A's home row (from the row 1091 to the row 1093), the H-swap bus of the row 1093 and the U-swap bus are configured to allow LU-A access to the moved unit memory. U-Swap bus is used because the unit memory 1036 is at a row 1093 that is below the home row 1091 of the LU-A. Access to other unit memories remains unchanged and continues to rely on only V-overflow, H-overflow, and Home row buses. The second stage 1002 also shows a planned movement from unit memory 1035 (belonging to table C) to the unit memory 1016 (now unused). The movement would replace 1035 with 1016 as a unit memory of Table C.

The third stage 1003 shows the result of the movement from unit memory 1035 to 1016. The content of the unit memory 1035 has been copied to the unit memory 1016 such that the unit memory 1016 is now in Table C while unit memory 1035 has become available. Since one of the unit memories for LU-C has been moved to a different row than the LU-C's home row (from the row 1093 to the row 1091), the H-swap bus of the row 1091 and the D-swap bus are configured to allow LU-C access to the moved unit memory. D-Swap bus is used because the unit memory 1016 is at the row 1091 that is above the home row 1093 of the LU-C. Access to other unit memories remains unchanged. At this stage, both U-swap bus and D-swap bus are used, because the memory movements of both stage 1002 and 1003 violate the constraints. Specifically, both the row 1091 and the row 1093 have unit memories allocated to more than two different tables (Tables A, C, B for the row 1091 and Tables C, A, D for the row 1093). The pool of memory at this moment is constrained from performing any unit memory movement that would require routing resources beyond V-overflow, D-swap, U-swap, H-swap, H-overflow and home buses. In other words, the unit memory movement is constrained by a second set of constraints based on all of the available routing resources. Such a set of constraints includes, for example, a rule that prohibits unit memories in row to be assigned to more than three different LUs since there are only three horizontal buses per row (assuming one LU per home row).

The fourth stage 1004 shows the results of further movements of unit memories between the row 1091 and 1093. Specifically, all of the unit memories allocated to table C have now been moved to the row 1091, and all of the unit memories allocated to table A except the unit memory 1011 have been moved to the row 1093. As illustrated, all of the unit memories at row 1091 belonging to Table C are accessible by LU-C through the D-swap bus, while all of the unit memories at row 1093 belonging to Table A are accessible by LU-A through the U-swap bus. The home row bus of the row 1093 is no longer used since all of unit memories allocated to Table C are no longer at LU-C's home row.

The fifth stage 1005 shows the result of the movement from the unit memory 1011 to the unit memory 1031. This movement causes the last unit memory of Table A to be relocated to the row 1093, away from LU-A's home row. Consequently, the home row bus of both rows 1091 and 1093 are no longer used. However, the U-swap and D-swap buses are still being used by LU-A and LU-C respectively to reach their unit memories at different rows.

The sixth stage 1006 shows the result of a LU swap operation, in which LU-A and LU-C exchange places (e.g., by configuring the LU 1051 to perform the functions of LU-C and configuring LU 1053 to perform the function of LU-A). It is worth noting that after the movement of the last unit memory of table A, the memory allocation in the pool of memories complies with the constraints for minimizing routing resource usage. Routing resources in the pool can therefore be freed up for future dynamic reallocation operations. By exchanging LU-A and LU-C, both of LU-A and LU-C go back to using their home row buses for accessing their unit memories, leaving H-swap bus, D-swap bus, and U-swap bus free for further dynamic reallocation operations (that may violate the constraints for minimizing routing resource usage).

Figure 11:
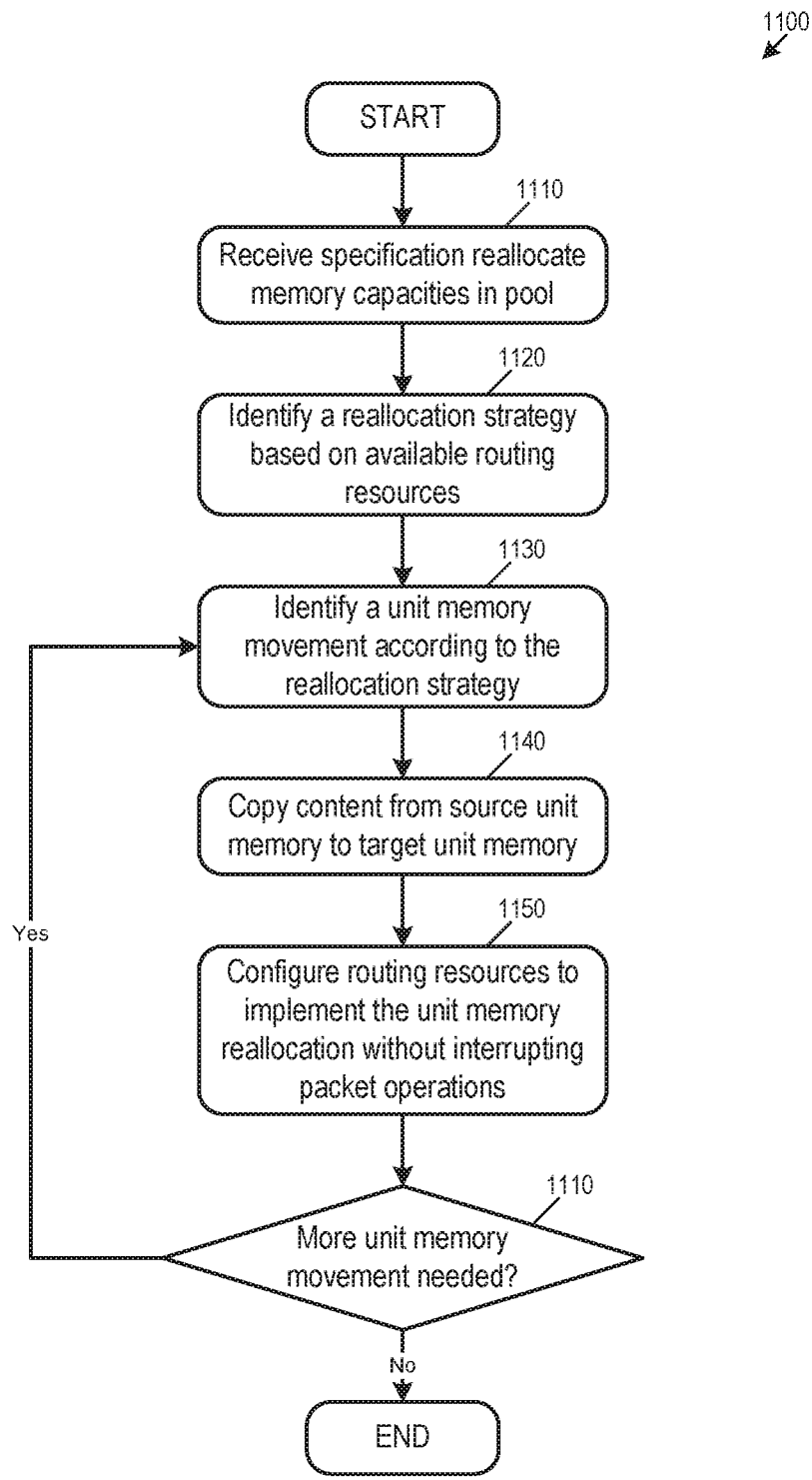
FIG. 11 conceptually illustrates a process for performing dynamic allocation in a pool of memories.

For some embodiments, FIG. 11 conceptually illustrates a process 1100 for performing dynamic allocation in a pool of memories. In some embodiments, the process 1100 is performed by a controller (e.g., the controller 380 of FIG. 3) controlling the routing resources of the pool while the pool is actively serving as tables or logical memories for packet operations (e.g., under OpenFlow). In some embodiments, the process 1100 is entirely under software control by using primitives such as "copy RAM", "atomically change all multiplexers", etc.

The process starts when it receives (at 1110) a specification to reallocate memory capacities in the pool. Such reallocation can include expansion of a logical memory/table, shrinking of a logical memory/table, etc. Some of these operations require movements of unit memories in the pool such as those described above by reference to FIGS. 9 and 10 in order to achieve the specified reallocation.

The process then identifies (at 1120) a reallocation strategy based on the available routing resources. In some embodiments, the process examines what kind of routing resources are available, and how to move unit memories within the limits imposed by the availability of routing resources in order to achieve the specified reallocation. In some embodiments, the process determines how and when to use the V-swap, D-swap, and H-swap buses for moving unit memories. In some embodiments, the process tries to adhere to a set of constraints for minimizing routing resource usage in order to free up as much routing resource as possible for unit memory movements.

Next, the process identifies (at 1130) a unit memory movement according to the reallocation strategy. The process then copies (1140) data content from the source unit memory to the destination or target unit memory. Once the destination unit memory is ready take over for the source unit memory, the process configures (1150) the routing resources in the pool to implement the unit memory movement without interrupting the packet operation serviced by the pool of memories. In some embodiments, the process sends control signals to control the multiplexers in the read paths and write paths in the vertical and horizontal routing resources.

Next, the process determines if there is any more memory movement that needs to be performed in order to accomplish the required memory reallocation. If so, the process returns to 1130. If all unit memory movements under the memory reallocation strategy has been completed, the process 1100 ends.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
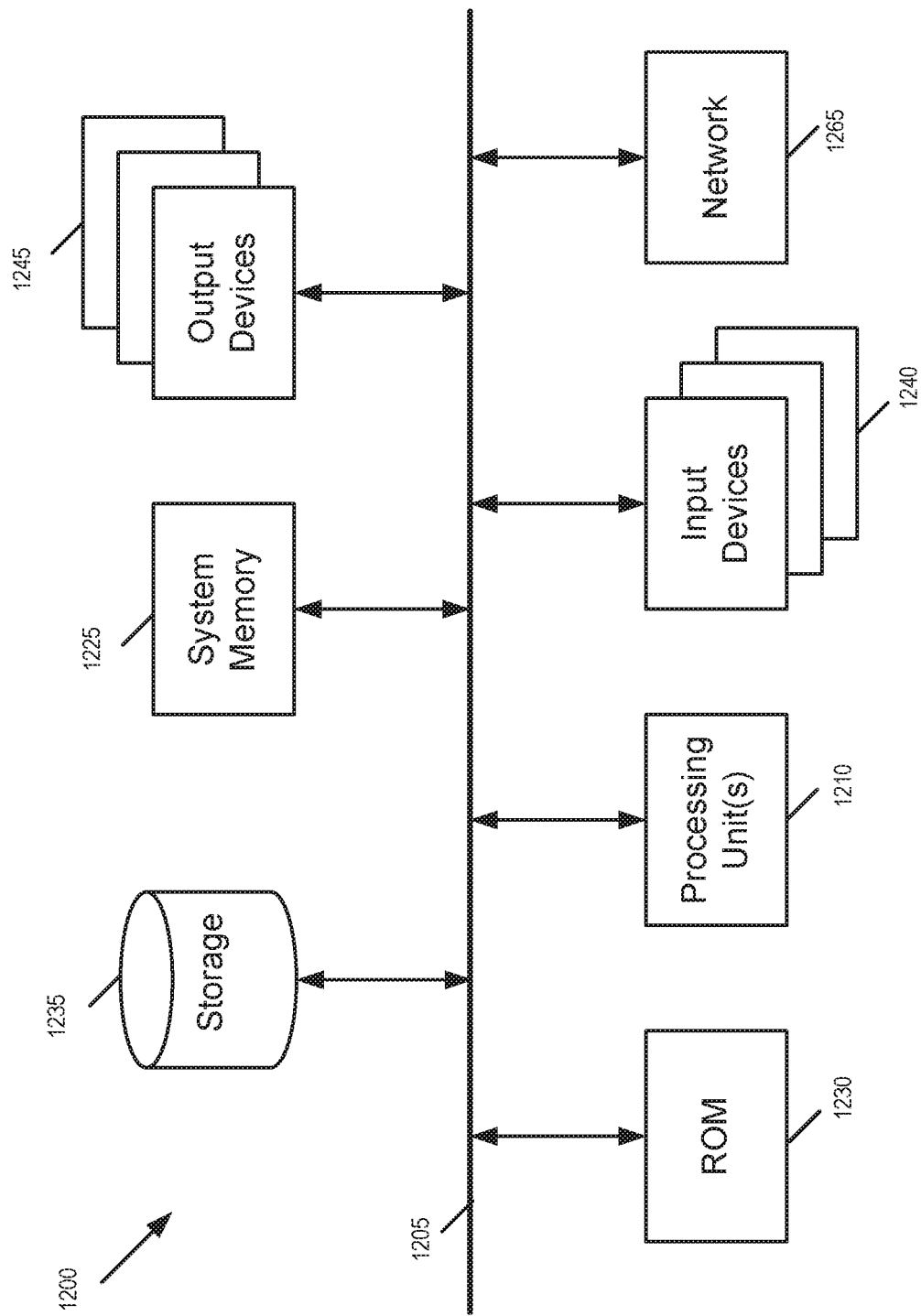
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
    configuring a pool of unit memories for implementing a plurality of tables, wherein each table is allocated a unique set of the unit memories, said configuring constrained by a first set of constraints for using routing resources in the pool;
    receiving packets and computing packet forwarding decisions based on data from the received packets and data stored in each table; and
    reconfiguring the pool of unit memories in order to re-allocate a unit memory from a first table to a second table while using said tables to compute packet forwarding decisions, said reconfiguring constrained by a second set of constraints for using routing resources in the pool.

2. The method of claim 1, wherein the pool of unit memories is organized into a plurality of rows, wherein re-allocating a unit memory comprises moving the content of a unit memory at a first row to a unit memory at a second row that is different from the first row.

3. The method of claim 2, where each table is further allocated a logical unit, wherein the logical unit has direct access to unit memories in one of the rows.

4. The method of claim 3, where configuring the pool of unit memories comprises configuring the routing resources of the pool to provide the allocated logical unit of each table unobstructed access to each allocated unit memory of the table.

5. The method of claim 1, wherein the routing resource of the pool comprises a first set of routing resources and a second set of routing resources, where the first set of constraints limits the plurality of tables to using the first set of routing resources but not the second set of routing resources.

6. The method of claim 5, wherein the second set of constraints limits the plurality of tables to using the first set of routing resources and the second set of routing resources.

7. The method of claim 5, wherein the pool of unit memories is organized into a plurality of rows and each row is associated with a logical unit, wherein the first set of routing resources comprises a first vertical routing bus for allowing a logical unit to access unit memories at rows above the logical unit.

8. The method of claim 7, wherein the second set of routing resources comprises a second routing bus for allowing the logical unit to access unit memories at rows below the logical unit.

9. A method comprising:
    configuring a pool of unit memories for implementing a plurality of tables, wherein each table is allocated a unique set of the unit memories, said configuring constrained by a first set of constraints for using routing resources in the pool;
    copying content of a first unit memory to a second unit memory, wherein the first unit memory is allocated to a first table; and reconfiguring the pool of unit memories in order to allocate the second unit memory to the first table and to reallocate the first unit memory to a second table, said reconfiguring constrained by a second set of constraints for using routing resources in the pool.

10. The method of claim 9, wherein the routing resource of the pool comprise a first set of routing resources and a second set of routing resources, where the first set of constraints limits the plurality of tables to using the first set of routing resources but not the second set of routing resources.

11. The method of claim 10, wherein the second set of constraints limits the plurality of tables to using the first set of routing resources and the second set of routing resources.

12. The metod of claim 10, wherein the pool of unit memories is organized into a plurality of rows and each row is associated with a logical unit, wherein the first set of routing resources comprises a first vertical routing bus for allowing a logical unit to access unit memories at rows above the logical unit.

* * * * *